Figure 1:
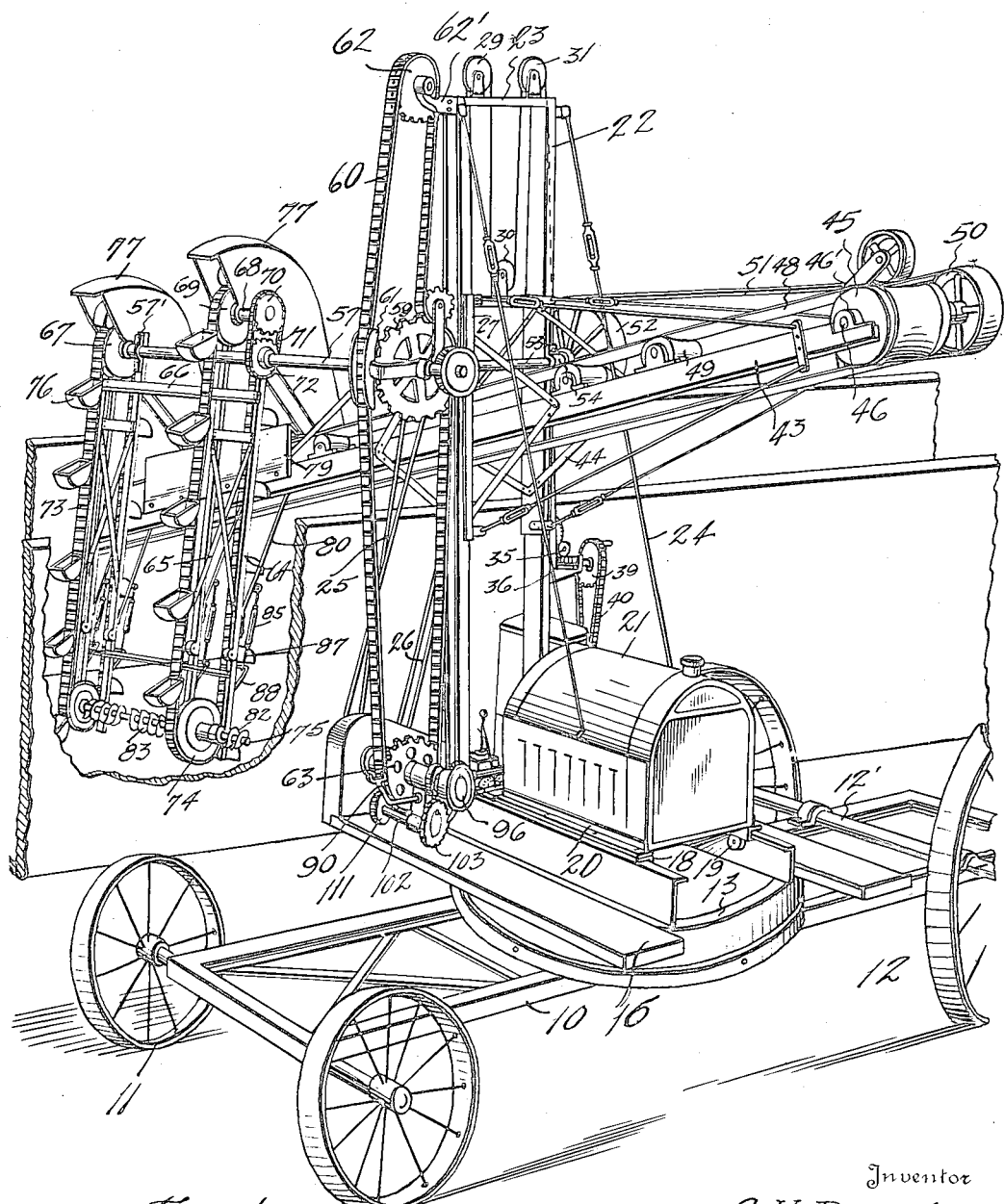

C. H. BEATTIE.
UNLOADING APPARATUS.
APPLICATION FILED SEPT. 4, 1920.

1,426,706.

Patented Aug. 22, 1922.
4 SHEETS—SHEET 1.

Inventor
C. H. Beattie.
By Jack A. Ashby
Attorney

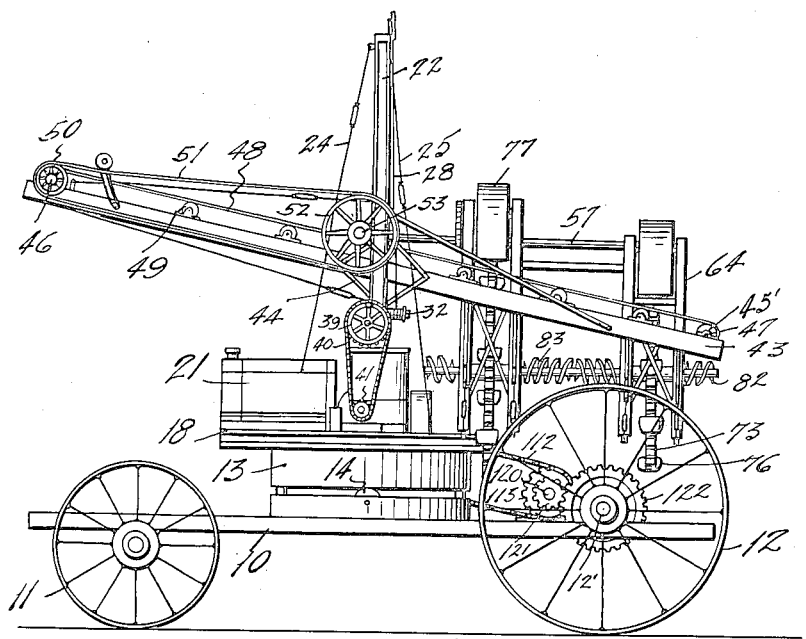
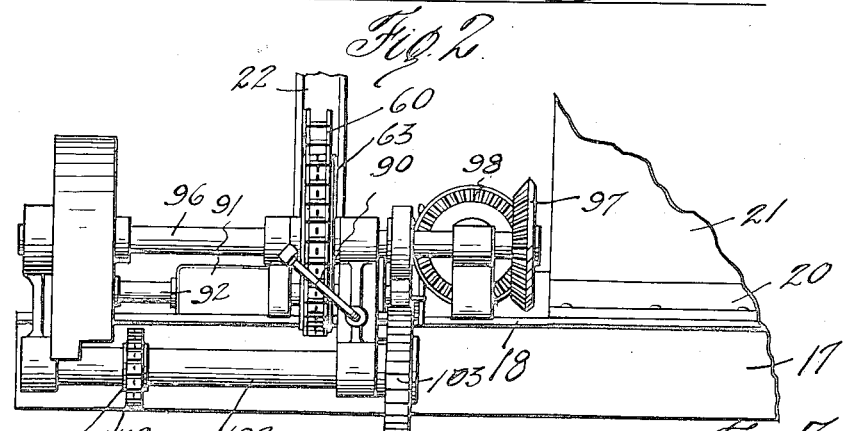
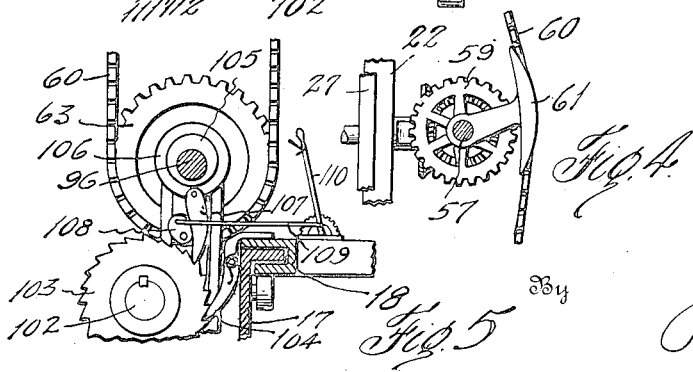

C. H. BEATTIE.
UNLOADING APPARATUS.
APPLICATION FILED SEPT. 4, 1920.

1,426,706.

Patented Aug. 22, 1922.
4 SHEETS—SHEET 3.

Inventor
C. H. Beattie.

By Jack A. Ashley
Attorney

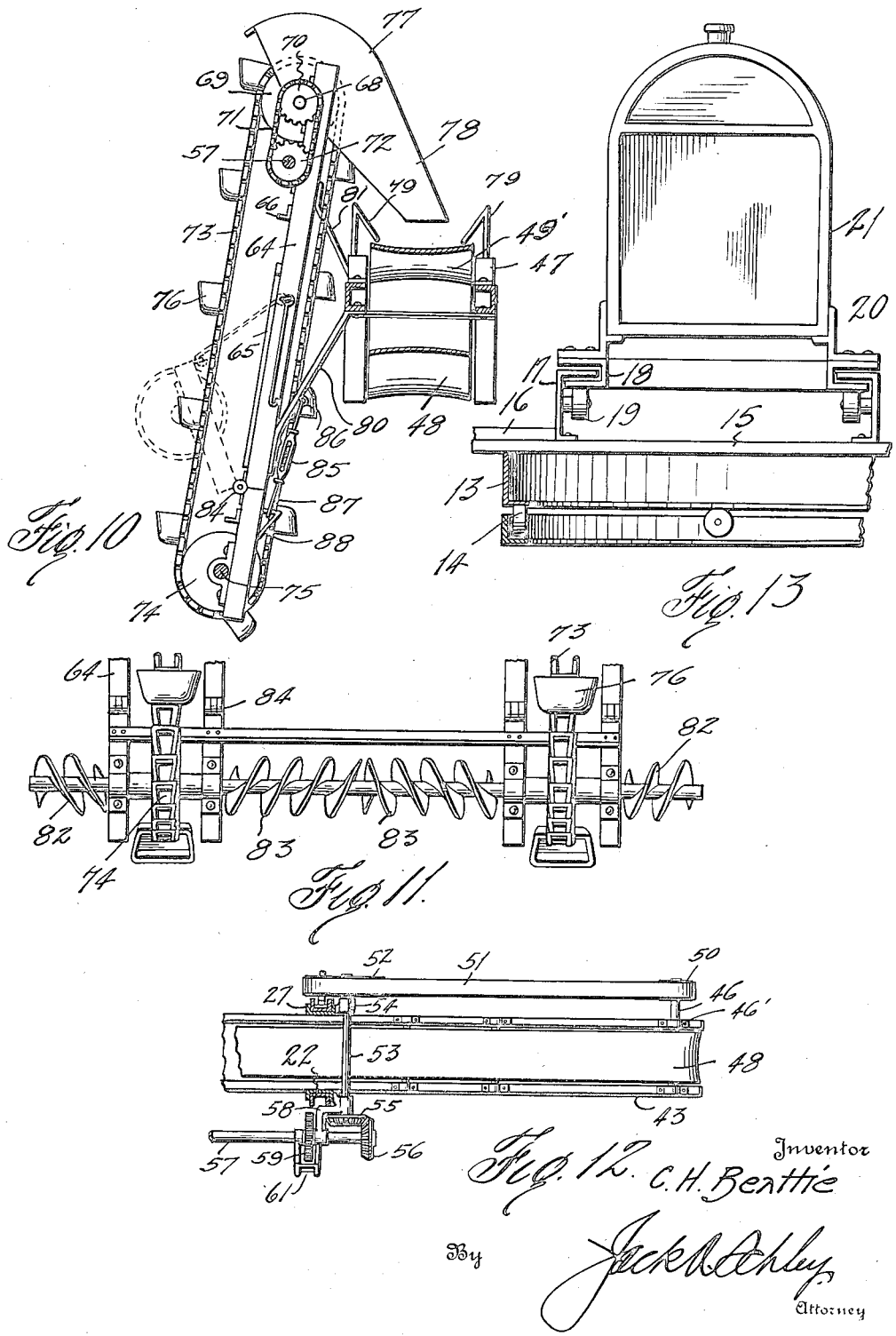

UNITED STATES PATENT OFFICE.

CLIFFORD H. BEATTIE, OF WAXAHACHIE, TEXAS.

UNLOADING APPARATUS.

1,426,706.   Specification of Letters Patent.   Patented Aug. 22, 1922.

Application filed September 4, 1920. Serial No. 408,248.

*To all whom it may concern:*

Be it known that I, CLIFFORD H. BEATTIE, a citizen of the United States, residing at Waxahachie, in the county of Ellis and State of Texas, have invented certain new and useful Improvements in Unloading Apparatus, of which the following is a specification.

This invention relates to new and useful improvements in unloading apparatuses.

The invention has to do with the production of an unloading device arranged to convey a commodity from a receptacle, such as a freight car, and deliver the same at a loading point. A particular feature is to provide means for removing the contents from a vehicle body, such as a freight car, and gradually moving the apparatus along as the contents are removed, thus automatically emptying the load. Another feature is to provide a portable apparatus which may be drawn up along side a vehicle body and adjusted to the proper height so that depending conveyers may be dropped into the body to pick up the material and deposit the same on an outwardly directed discharge conveyer, whereby the contents are removed and discharged from the end of the last named conveyer. An apparatus of this character will save labor and will carry out the unloading operation in much less time and more satisfactorily than where manual labor is used.

In carrying out the invention a vehicle is provided on which a turn-table is mounted. On the turn-table an upright support is mounted. A horizontal conveyer is mounted in a carriage vertically adjustable on a support. At one end of this conveyer vertical conveyers depend and are arranged to discharge onto the horizontal conveyer. Means is provided for driving the conveyers without interference from the adjusting means. The depending conveyers are also arranged to be folded so as to facilitate the placing of the same in the car body. Means is also provided for loosening the material to be elevated by the vertical conveyers.

Means is provided for automatically propelling the vehicle forwardly as the load is removed thus feeding the vertical conveyers to the material and compensating for that which is removed. This feeding means includes certain novel features. Other novel features of the invention will be hereinafter pointed out.

Figure 6:
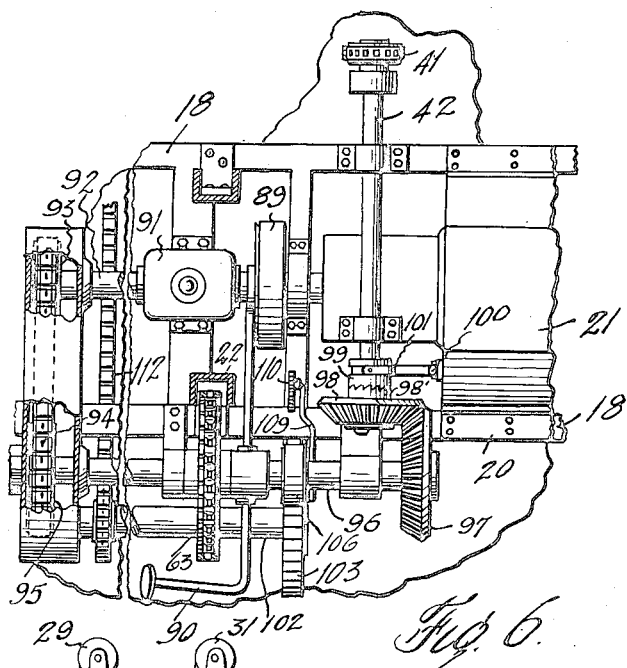
Figure 7:
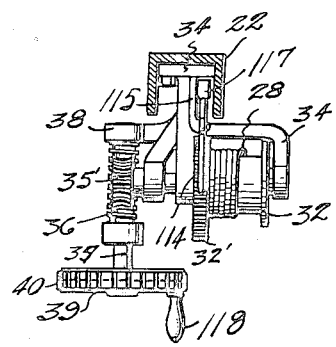
Figure 8:
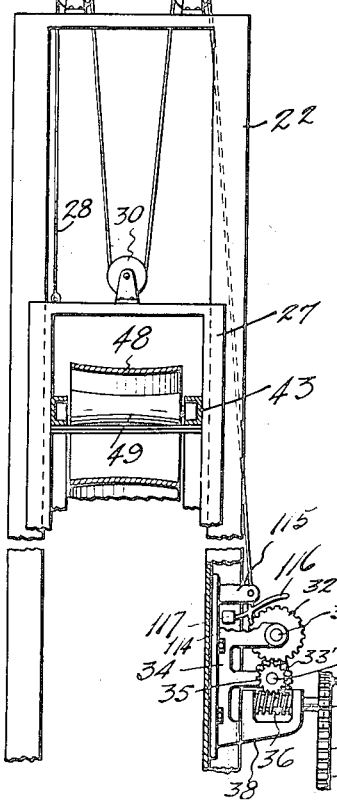
Figure 9:
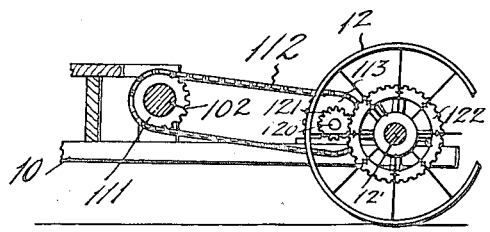

The invention will be more readily understood from a reading of the following specification and by reference to the accompanying drawings, in which an example of the invention is shown, and wherein:

Fig. 1 is a perspective view of an apparatus constructed in accordance with the invention, and showing the same in position with relation to a freight car, Fig. 2 is a side elevation of the apparatus with its parts in position for transporting, Fig. 3 is a partial front elevation of the driving and feeding means, Fig. 4 is a detail of the chain guard, Fig. 5 is a side elevation in detail of the feeding means, Fig. 6 is a plan view of the driving means, Fig. 7 is a detail in plan of the elevating mechanism, Fig. 8 is an elevation of the elevating means for the conveyers, Fig. 9 is a detail of the feeding means, showing the wheel driving device, Fig. 10 is a detail of the vertical conveyers, Fig. 11 is a detail of the bottom conveyer and loosening means, Fig. 12 is a detail of the horizontal conveyer, and Fig. 13 is a partial front elevation of the motor and turn-table.

In the drawings the numeral 10 designates a vehicle frame supported on front wheels 11 and rear wheels 12. Suitable means may be provided for steering the front wheels and means may be provided for imparting motion to the rear wheels to propel the vehicle when it is being transported from place to place, but as these form no particular part of the invention the same has not been illustrated, especially for the further reason that the vehicle could be moved in any suitable manner. Referring particularly to Figs. 1, 2 and 13, it will be seen that a circular turn-table 13 is mounted upon grooved rollers 14 carried at the central portion of the frame 10. The turn-table 13 is in the form of a ring and supports a platform 15 which latter includes foot boards 16.

Between the foot boards channel irons 17 are mounted with their upper horizontal flanges directed inwardly and being received in channel members 18. Guide rollers 19, as is best shown in Fig. 13, are mounted in the channels 17 and support the channel members 18. Angle members 20 are fastened on top of the channel members 18 and support a motor 21 which may be of any suitable construction, that illustrated representing the usual automobile motor with hood and radiator.

The members 18 and 20 constitute a bed or supporting frame for the motor which is slidable on the turn-table. The members 18 extend rearwardly as is best shown in Fig. 6. A pair of vertical channel members 22 extend vertically from between said members to which they are suitably fastened. These members are connected at their upper ends by a cross bar 23, whereby an upright guide frame or standard is formed. The members 22 are braced by rods 24 extending from the bar 23 down to the front of the motor and brace rods 25 extending from the members 22 down to the members 18. Brace arms 26 also extend downwardly from the members 22 to the members 18. In this way the upright standard is suitably fastened.

A carrier 27 is mounted between the members 22 and arranged to slide vertically thereon as will be clear from Figs. 1 and 8. A flexible connection 28 extends from one side of the carrier upward and over a pulley 29 on top of the bar 23, then downward and around a pulley 30 on top of the carrier; from thence upward and over a pulley 31 on top of the bar 23. The connection 28 which may be a steel cable or other element, passes through suitable holes in the bar 23 and after passing over the pulley 31 extends downward and is coiled around a drum 32 as is best shown in Figs. 2, 7 and 8. The drum 32 is mounted on a shaft 33 mounted in a bracket 34 on one of the members 22. The drum has a gear 32' at one end driven by a pinion 33' mounted on an underlying shaft 35'. On the shaft 35' a worm wheel 35 is fastened and meshes with a worm screw 36 mounted on a shaft 37 supported in a bearing bracket 38 connected with 34 and at right angles to the shaft 33. On the outer end of the shaft 37 a sprocket 39 is fastened and driven by an endless chain 40. The chain extends downwardly and passes around a sprocket 41 fastened on a transverse shaft 42 which is driven in a manner which will be hereinafter described. It will be seen that by revolving the drum 32 the carrier will be raised and lowered.

To the inner sides of the carrier 27 elongated beams 43 are fastened and braced by diagonal braces 44 extending outwardly from the upper and lower ends of the carrier. These beams form the side of a conveyer member which is inclined slightly as will be clear from the drawing. A grooved face roller 45 is mounted on a shaft 46 at the upper or outer end of the conveyer, said shaft being supported in boxes 46' on the outer ends of the beams 43. A similar pulley 45' is mounted on the lower or rear end of the conveyor in boxes 47. An endless conveyer belt 48 has its ends supported on the pulleys 45 and 45'. A plurality of concaved rollers 49 are mounted between the beams at spaced intervals and support the upper end of the belt. By this arrangement the belt is given a trough shape so as to convey sand and gravel and the like without the latter falling from the edges of said belt. A pulley 50 is mounted on the shaft 46 and is driven by a belt 51 from a larger pulley 52 mounted on a transverse shaft 53 which is carried in boxes 54 mounted on the carrier 27 as is shown in Figs. 8 and 12.

The shaft 53 carries a bevel gear 55 which is driven by a bevel gear 56 mounted on a drive shaft 57 at right angles to the shaft 53. One end of the shaft 57 is supported in a bearing bracket 58 projecting outwardly from the carrier 27. On the shaft 57 a large spocket wheel 59 is fastened. The inner leg of an endless chain 60 engages with the sprocket 59 while the outer leg passes over a guard 61 attached to the bracket 58 whereby said leg of the chain is held out of engagement with sprocket wheel. The upper end of the chain 60 passes around a sprocket 62 mounted in a bracket 62' at the upper end of the standard; while the lower end of said chain passes around a spocket 63 whereby said chain is driven. This arrangement permits a vertical adjustment of the parts without interferring with the transmission of motion to the shaft 57.

At the inner or lower end of the conveyer a pair of vertical conveyer standards 64 are fastened to the sides of one of the beams 43. Each conveyer standard is formed of suitable upright angle irons connected by braces 65 and is otherwise held rigid. The standards are connected near their upper ends by a cross-bar 66. The end of the shaft 57 is mounted in a bearing box 57' and on its outermost end carries a pulley 67. A counter shaft 68 is mounted on the upper end of the innermost standard and carries a pulley 69. A sprocket 70 on the shaft 68 is driven by a sprocket chain 71 from a sprocket 72 on the shaft 57. Endless chains 73 have their upper ends supported on the pulleys 67 and 69; while their lower ends pass around pulleys 74 on a shaft 75 mounted at the lower end of the standard. Suitable buckets 76 are mounted on the chains. The chains are of such construction as to embrace the pulleys and cannot be displaced therefrom.

It will be noticed that one of the standards 64 extends above the other; while their lower ends terminate in the same horizontal plane. Metal hoods 77 are mounted on top of the standards and are provided with spouts 78 which overhang the center of the belt 48. As this belt inclines upwardly it is necessary to have the innermost spout at a higher elevation than the other spout as will be evident. Guard members 79 are mounted on the beam 43 so as to overhang the belt on each side of the spouts so as to prevent the material which is discharged onto the belt from flowing off the sides of said belt. The standards are supported by braces 80 and 81 extending from the nearest beam 43 as is best shown in Fig. 10.

The shaft 75 extends from one standard to the other and laterally on each side thereof as is best shown in Fig. 11. Conveyer screws 82 are mounted on the portion of the shaft extending outwardly from each side of the standards. On the inner side of each standard a conveyer screw 83 is fastened on the shaft. The screws are directed so as to convey material on each side of each standard toward that standard. In this way the material at the bottom of a vehicle body, such as sand, will be loosened by the screws and conveyed toward the standards so as to be picked up by the buckets 76 as will be obvious. It will be seen that some materials have a tendency to pack and means must be provided for loosening the same.

In order to fold up the standards so that the same may be more readily lifted over the side of a gondola freight car, hinge joints 84 are provided below the braces 80. Turn buckles 85 are fastened to eyes 86 on the braces 80 and have hooks 87 which engage in loops 88 below the hinges. It will be seen that by loosening the turn buckles and disengaging the hooks from the loops the lower portions of the standards including the shaft and conveyers may be swung upward as shown in dotted lines in Fig. 10, and suitably fastened so that the standards are considerably shortened and may be readily swung upward and over the sides of the freight car.

The motor is provided with the usual clutch 89 having a foot pedal 90 which is extended outwardly over one side of the frame so as to be accessible from the platform footboard 16. The usual transmission 91 is associated with the clutch and is connected with a rearwardly extending shaft 92. A sprocket 93 fastened on the rear end of the shaft 92 drives a chain 94 which in turn drives a sprocket 95 fastened on the rear end of a drive shaft 96 which latter is suitably mounted at one side of the frame of the motor plant. The sprocket 63 which drives the chain 60 is fastened on the shaft 96 and is driven thereby. In this way motion is transmitted to the shaft 57 by the sprocket wheel 59.

As is shown in detail in Figs. 3 and 6, a miter gear 97 is mounted on the forward end of the shaft 96. A gear 97 meshes with a miter pinion 98 loosely confined on the shaft 42. The pinion 98 has a clutch hub 98' arranged to be engaged by a clutch sleeve 99 which is slidable on the shaft 42 for imparting motion thereto. By this means the sprocket 41 and the chain 40 are driven for revolving the winding drum 32. A lever 100 is pivotally supported on the frame and has a yoke 101 engaging in the sleeve 99 for sliding the same to disconnect or engage it with the clutch hub 98'.

As before stated it is necessary to move the vehicle forward so as to feed the buckets 76 to the material as the same is removed. For carrying out this feature I mount a counter-shaft 102 below the shaft 96 as is best shown in Figs. 3, 5 and 6. A ratchet wheel 103 is fastened on the counter-shaft and held by a spring pressed pawl 104 (Fig. 5). An eccentric 105 is mounted on the shaft 96 and carries a ring 106 from which a dog 107 depends. The dog is pivoted on the ring and engages the teeth of the ratchet. Each revolution of the eccentric forces the dog downward thus imparting a partial rotation to the ratchet. A cam lever 108 is pivoted adjacent the dog and is connected at its upper end with a rod 109 which has its opposite end connected with an adjusting lever 110 of suitable construction. By swinging the lever inward the cam lever is swung so as to engage the dog 107 and hold the same out of engagement with the teeth of the ratchet. In this way the transmission of motion to the ratchet is interrupted.

A sprocket wheel 111 is fixed on the shaft 102 and drives a sprocket chain 112 which, as is shown in Fig. 9, drives a larger sprocket wheel 113 mounted on a counter shaft 120. A pinion 121 mounted on the counter shaft meshes with a gear 122 on the rear axle 12' of the vehicle. It will be seen that each time the ratchet wheel 103 is given a partial rotation, motion is transmitted to the rear axle whereby the rear wheels 12 are revolved. In this way the vehicle is propelled forwardly and the conveyer fed to the load or work, as the commodity is removed.

When the conveyer is not unloading material the turn table is swung around so as to position the belt conveyer over the vehicle frame 10, as is shown in Fig. 2. The conveyer standards 64 are folded up and the device is ready to be transported. When it is desired to use the apparatus to unload a car, the vehicle is drawn up along side of the car, as shown in Fig. 1, and the turn table swung at right angles to the frame 10. In order to get the conveyor standards into the car it will probably be necessary to elevate the carrier 27 which is accomplished by swinging the lever 100 to throw the clutch sleeve 99 into engagement with the clutch hub 98' whereby motion is transmitted to shaft 42 and the shaft 37 revolved by means of the chain 40. The shaft 37 will revolve the drum 32 by means of the worm gear 35 and 36 and gears 32' and 33'. When the drum is revolved the cable 31 will be wound thereon, thus elevating the carrier. When the carrier is in its elevated position, the lower end of the horizontal conveyer will be sufficiently high to permit the standards 64 to be swung over the side of the car.

It will be seen that some means must be provided to prevent the drum 32 from unwinding, in order to support the conveyers. For this purpose I mount a pawl 114 (see Figs. 7 and 8) on an arm 115 extending from the bracket 34. The pawl engages the side of the gear 32' nearest the upright 22 and on which side, the cable 31 passes from the drum. The pawl is provided with a lever 116 on its outer side and with a weight 117 on its inner side, said weight tending to hold the pawl in engagement with the gear. It is evident that when motion is imparted to wind the cable on the drum, the gear will revolve away from the end of the pawl, thus throwing same out of its teeth. When it is desired to lower the conveyers it is necessary to unwind the cable 31 from the drum. For this purpose a handle 118 is provided on the sprocket 39. By pressing on the lever 116, the pawl is swung out of engagement with the gear 32', thus permitting the sprocket 39 to be turned by hand, whereby the drum is unwound.

After the standards are over the bed of the car, their lower ends are unfastened and swung down. The hooks 87 are next engaged in the loops 88 and the turn buckles adjusted so as to aline the hinged portions of the standards. The parts are positioned by raising or lowering the carrier 27 so that the conveyer screws 82 and 83 are immediately above the floor, of the car. If desired the carrier can be lowered until the screws are embedded in the load and the carrier gradually lowered, as the material is removed, until just over the floor; or the material may be shoveled out to make room for the screws and standards.

When the parts are in position the transmission 91 is shifted in the usual manner, whereby motion is transmitted to the shaft 92 and sprocket 93. The sprocket 93 drives the shaft 96 by chains 94. The shaft 96 revolves the sprocket 63, whereby the chain 60 is traversed and motion imparted to the shaft 57 by means of sprocket 59. The shaft 57 revolves wheel 67 and also wheel 69, through agency of sprockets 70 and 72, chain 71 and shaft 68; whereby elevators 73 are operated and the screws 82 and 83 revolved. The material is fed toward elevators by the screws and then elevated to hoods 77 from which it is delivered through the spouts 78 to the belt 48.

The shafts 57 also drives the shaft 53 by means of the gears 55 and 56 (Fig. 12), whereby the pulley 50 is driven by the belt 51 and pulley 52. The pulley 50 revolves the shaft 46 which revolves the roller 45, thus imparting motion to the belt 48. The belt 48 is thus driven so as to convey the material outwardly and discharge the latter from its outer end.

The shaft 96 also revolves the eccentric 105 which reciprocates the ring 106, whereby the pawl 107 is operated to impart a step by step rotation to the ratchet 103. The ratchet revolves the shaft 102 which in turn imparts motion to chain 112 by means of sprocket 111. The chain 112 revolves the sprocket 113 (Fig. 9) which revolves rear wheels 12 and moves apparatus forward to feed screws 82 and 83 to material in car.

A wagon or truck may be driven under the outer end of the belt 48 and quickly load. It is obvious that the unloader may be used for unloading various materials and the elevators may be placed in a box car for unloading grain and the like. The apparatus has a large usage and may be readily placed in position and operated.

I claim—

1. In an unloading apparatus, the combination of an upright portable support, a carriage mounted to slide vertically in said support, an elongated conveyor extending through the carriage, an elevator depending from one end of the conveyor and having its upper end discharging onto said conveyer, driving means for the conveyor and elevator mounted on the carriage, and self contained means mounted on said support for imparting a slow forward movement to the same, whereby the elevator is fed to the work.

2. In an unloading apparatus, a wheel supported frame, a platform mounted to turn on said frame, an upright support mounted on the platform, a driving means mounted on the platform, a carriage slidable vertically on the upright, a conveyor extending through the carriage, an elevator depending from one end of the conveyor and having its upper end overhanging said conveyer, driving elements for the conveyor and elevator carried by the carriage, means for transmitting motion from the driving means to said elements, and means connected with the driving means for imparting a step by step movement to the wheel supported frame.

3. In an unloading apparatus, a wheel supported frame, a platform mounted to turn on said frame, an upright mounted on the platform, a motor mounted on said platform, a carriage slidable vertically on the upright, a conveyor extending through the carriage, an elevator depending from one end of the conveyor and having its upper end overhanging said conveyor, driving elements for the conveyor and elevator carried by the carriage, and means for transmitting motion from the motor to said elements.

4. In an unloading apparatus, a wheel supported frame, a platform mounted to turn on said frame, an upright mounted on the platform, a motor mounted on said platform, a carriage slidable vertically on the upright, a conveyor extending through the carriage, an elevator depending from one end of the conveyor and having its upper end overhanging said conveyor, driving elements for the conveyor and elevator carried by the carriage, means for transmitting motion from the motor to said elements, and means for adjusting the conveyor and elevator as a unit.

5. In an unloading apparatus, a wheel supported frame, a platform mounted to turn on said frame, an upright mounted on the platform, a motor mounted on said platform, a carriage slidable vertically on the upright, a conveyor extending through the carriage, an elevator depending from one end of the conveyor and having its upper end overhanging said conveyor, driving elements for the conveyor and elevator carried by the carriage, means for transmitting motion from the motor to said elements, means for adjusting the conveyor and elevator as a unit, and means for advancing the wheel supported frame step by step as the load is removed by the elevator.

6. In an unloading apparatus, a portable support, an upright mounted on the support, a carriage slidable vertically on the upright, a troughing belt conveyor having a frame rigidly supported in the carriage, and an elevator depending from one end of the conveyor and having its upper end discharging onto the belt.

7. In an unloading apparatus, a portable support, an upright mounted on the support, a carriage slidable vertically on the upright, a troughing belt conveyor having a frame rigidly supported in the carriage, an elevator depending from one end of the conveyor and having its upper end discharging onto the belt, and means for adjusting the carriage vertically on the upright, whereby the conveyor and elevator are moved as a unit.

8. In an unloading apparatus, a portable support, an upright mounted on the support, a carriage vertically adjustable on the upright, a conveyor extending through the carriage, and an elevator depending from one end of the conveyor and having its lower portion hinged to be folded upwardly when not in use.

9. In an unloading apparatus, a portable support, an upright mounted on the support, a carriage vertically adjustable on the upright, a conveyor extending through the carriage, an elevator depending from one end of the conveyor and having its lower portion hinged to be folded upwardly when not in use, and means for fastening the hinged portion of the elevator in position when in use.

10. In an unloading apparatus, a wheel supported frame, a turntable mounted on the frame, a support slidably mounted on the turntable, an upright carried by the support, a motor carried by the support, a carriage slidable vertically on the upright, a conveyor extending through the carriage, an elevator depending from one end of the conveyor and discharging onto the same, driving elements for the conveyor and elevator carried by the carriage, and means for transmitting motion from the motor to said driving elements.

11. In an unloading device, a wheel supported frame, elevating and conveying mechanisms mounted on the frame, a motor mounted on the frame and having connection with the elevating and conveying mechanism, a drive shaft mounted on the frame, means for transmitting motion from the drive shaft to the wheels of the frame, a ratchet mounted on the drive shaft, and means for intermittently transmitting rotation to the ratchet operated by the motor.

12. In an unloading device, a wheel supported frame, elevating and conveying mechanism mounted on the frame, a motor mounted on the frame and having connection with the elevating and conveying mechanism, a drive shaft mounted on the frame, means for transmitting motion from the drive shaft to the wheels of the frame, a ratchet mounted on the drive shaft, means for intermittently transmitting rotation to the ratchet operated by the motor, and means for throwing said transmitting means out of operation.

13. In an unloading apparatus, a wheel supported frame, a platform mounted to turn on said frame, an upright support mounted on the platform, a driving means mounted on the platform, a carriage slidable vertically on the upright, a conveyor extending through the carriage, an elevator depending from one end of the conveyor and having its upper end overhanging said conveyor, driving elements for the conveyor and elevator carried by the carriage, means for transmitting motion from the driving means to said elements, and means for shifting the support transversely of the frame.

14. In an unloading apparatus, a wheel supported frame, a platform mounted to turn on said frame, an upright support mounted on the platform, a driving means mounted on the platform, a carriage slidable vertically on the upright, a conveyor extending through the carriage, an elevator depending from one end of the conveyor and having its upper end overhanging said conveyor, driving elements for the conveyor and elevator carried by the carriage, means for transmitting motion from the driving means to said elements, and means for adjusting the elevator and conveyor as a unit vertically in the support.

15. In an unloading apparatus, a platform an upright support mounted on the platform, a vertically adjustable carriage mounted in the support, conveyor elements carried by the carriage, a flexible connection depending from the top of the support and attached to the carriage, a drum on which the connection is wound to elevate the carriage, a ratchet connected with said drum, a pawl engaging the ratchet, gear elements for revolving said drum and ratchet, driving means for said elements, and means for manually operating said elements to unwind the connection from the drum.

16. In an unloading apparatus, a platform an upright support mounted on the platform, a vertically adjustable carriage mounted in the support, conveyor elements carried by the carriage, a flexible connection depending from the top of the support and attached to the carriage, a drum on which the connection is wound to elevate the carriage, a ratchet connected with said drum, a pawl engaging the ratchet, gear elements for revolving said drum and ratchet, driving means for said elements, driving means mounted on the platform, and clutch interposed between the driving means and the means for driving said elements.

17. In an unloading apparatus, a portable support, an upright frame, a carriage slidable vertically in said frame, means for adjusting the carriage in said frame, beams extending through the carriage, an endless belt carried by the beams, elevators depending from one end of the beams, an endless chain having one end supported by the upper portion of the frame, driving means mounted on the support and engaging the lower end of the chain, a sprocket wheel mounted on the carriage and engaging the chain, driving connections between the wheel and the conveyor, and driving connections between the wheel and the elevators.

In testimony whereof I affix my signature.

CLIFFORD H. BEATTIE.